United States Patent
Bresnan et al.

(10) Patent No.: US 6,829,591 B1
(45) Date of Patent: Dec. 7, 2004

(54) ROUTER INSTRUCTION PROCESSOR FOR A DIGITAL DOCUMENT DELIVERY SYSTEM

(75) Inventors: Mark Bresnan, Newtown, CT (US); James M. Valovich, Bridgeport, CT (US)

(73) Assignee: Pitney Bowes Inc., Stamford, CT (US)

( * ) Notice: Subject to any disclaimer, the term of this patent is extended or adjusted under 35 U.S.C. 154(b) by 396 days.

(21) Appl. No.: 09/289,901

(22) Filed: Apr. 12, 1999

(51) Int. Cl.$^7$ .............................................. G06F 17/60
(52) U.S. Cl. ...................................................... 705/40
(58) Field of Search ........................... 705/400, 26, 27, 705/40

(56) References Cited

U.S. PATENT DOCUMENTS

| | | | |
|---|---|---|---|
| 4,908,850 A | 3/1990 | Masson | 379/88 |
| 4,941,091 A | 7/1990 | Breault et al. | 364/406 |
| 5,142,662 A | 8/1992 | Gump et al. | 395/100 |
| 5,187,787 A | 2/1993 | Skeen | 395/600 |
| 5,220,501 A | 6/1993 | Lawlor et al. | 364/408 |
| 5,280,531 A | 1/1994 | Hunter | 364/464 |
| 5,283,829 A | 2/1994 | Anderson | 380/9 |
| 5,381,527 A | 1/1995 | Inniss et al. | 395/200 |
| 5,383,113 A | 1/1995 | Kight et al. | 705/40 |
| 5,465,206 A * | 11/1995 | Hilt et al. | 364/406 |
| 5,479,411 A | 12/1995 | Klein | 370/110.1 |
| 5,483,445 A | 1/1996 | Pickering | 705/40 |
| 5,493,692 A | 2/1996 | Thelmer et al. | 455/26.1 |
| 5,496,991 A | 3/1996 | Delfer et al. | 235/379 |
| 5,508,817 A | 4/1996 | Kunigame | 358/402 |
| 5,509,071 A | 4/1996 | Petrie, Jr. et al. | 380/4 |
| 5,513,126 A | 4/1996 | Harkins et al. | 364/514 A |
| 5,608,786 A | 3/1997 | Gordon et al. | 379/100 |
| 5,627,764 A | 5/1997 | Schutzman et al. | 364/514 R |
| 5,630,060 A | 5/1997 | Tang et al. | 395/200.01 |
| 5,657,461 A | 8/1997 | Harkins et al. | 395/333 |
| 5,675,507 A | 10/1997 | Bobo, II | 364/514 R |
| 5,684,965 A | 11/1997 | Pickering | 395/234 |
| 5,694,551 A | 12/1997 | Doyle et al. | 705/26 |
| 5,696,906 A | 12/1997 | Peters et al. | 705/34 |
| 5,699,528 A | 12/1997 | Hogan | 705/40 |
| 5,761,650 A | 6/1998 | Munsil et al. | 705/34 |
| 5,790,790 A | 8/1998 | Smith et al. | 395/200 |
| 5,794,221 A | 8/1998 | Egendorf | 705/40 |
| 5,802,498 A | 9/1998 | Comesanas | 705/34 |
| 5,825,865 A | 10/1998 | Oberlander et al. | 379/211 |
| 5,832,460 A * | 11/1998 | Bednar et al. | 705/27 |
| 5,873,073 A | 2/1999 | Bresnan et al. | 705/410 |
| 5,884,284 A | 3/1999 | Peters et al. | 705/30 |
| 5,884,288 A * | 3/1999 | Chang et al. | 705/40 |
| 5,956,693 A | 9/1999 | Geerlings | 705/14 |
| 5,963,925 A * | 10/1999 | Kolling et al. | 705/40 |
| 6,031,625 A | 2/2000 | Sherman et al. | 358/1.18 |
| 6,044,362 A | 3/2000 | Neely | 705/34 |
| 6,157,924 A | 12/2000 | Austin | 707/10 |

FOREIGN PATENT DOCUMENTS

WO    WO 01/33936 A2 *  5/2001   ........... G06F/17/60

OTHER PUBLICATIONS

Walker, Which Way To Bill Your Customers: By Mail or Electronic Delivery, or Both?, Feb. 1999, Direct Marketing, pp. 44–47.*

* cited by examiner

Primary Examiner—Joseph Thomas
Assistant Examiner—Christopher L. Gilligan
(74) Attorney, Agent, or Firm—Michael J. Cummings; Charles R. Malandra, Jr.; Angelo N. Chaclas

(57) ABSTRACT

A router instruction processor for a digital document delivery system 10 interacts with one or more electronic inserts and a bill processing server to function as a general document fulfillment server. The router instruction processor makes use of the electronic inserters and bill processing server to ensure that documents as contained in Send Request objects are presented to their destinations according to sender requirements and recipient preferences. The router instruction processor further ensures the sender requirements are not compromised by recipient preferences to the extent that conflict may arise.

8 Claims, 5 Drawing Sheets

SEND REQUEST OBJECT

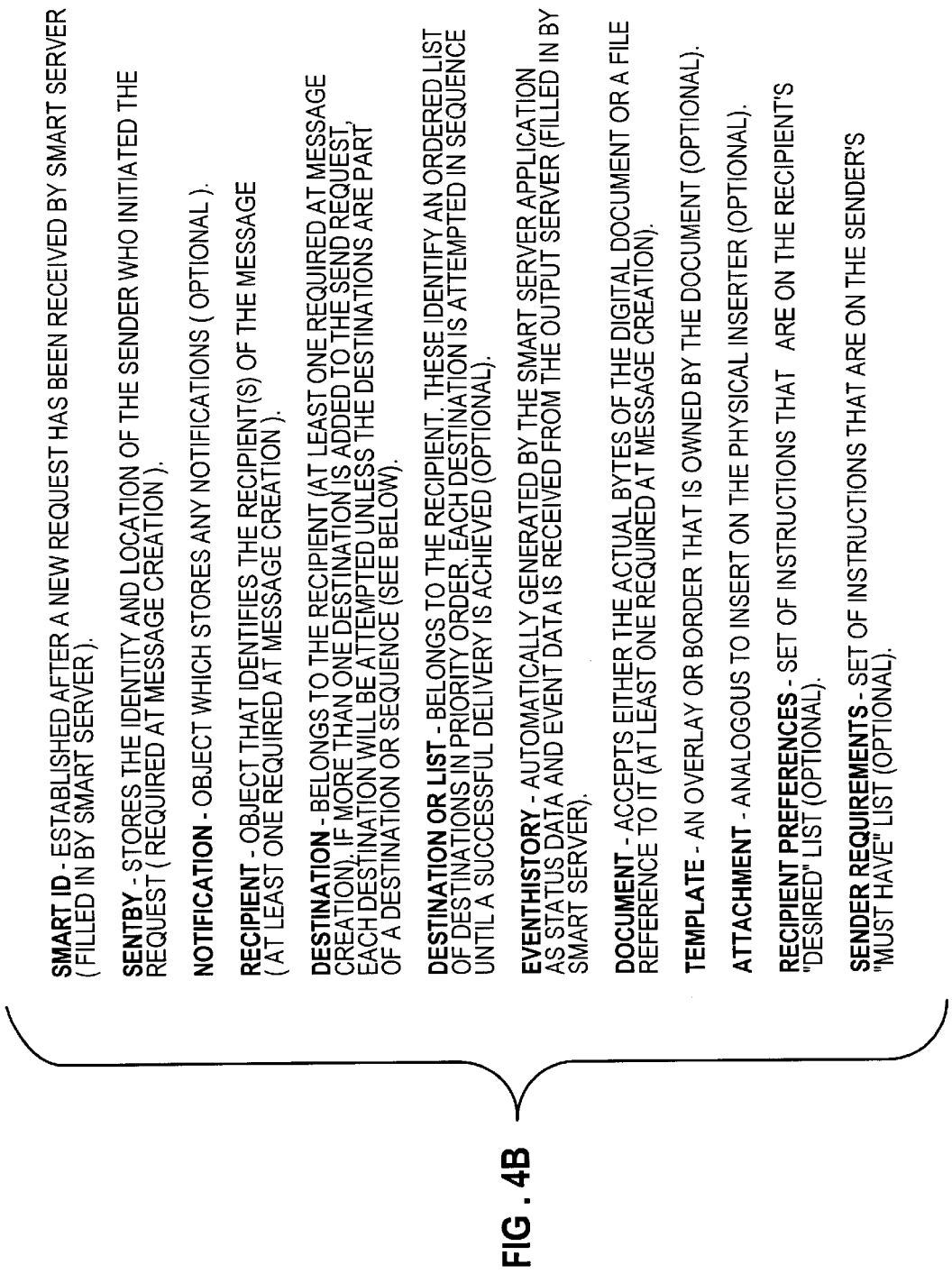

SMART ID - ESTABLISHED AFTER A NEW REQUEST HAS BEEN RECEIVED BY SMART SERVER (FILLED IN BY SMART SERVER).

SENTBY - STORES THE IDENTITY AND LOCATION OF THE SENDER WHO INITIATED THE REQUEST (REQUIRED AT MESSAGE CREATION).

NOTIFICATION - OBJECT WHICH STORES ANY NOTIFICATIONS (OPTIONAL).

RECIPIENT - OBJECT THAT IDENTIFIES THE RECIPIENT(S) OF THE MESSAGE (AT LEAST ONE REQUIRED AT MESSAGE CREATION).

DESTINATION - BELONGS TO THE RECIPIENT (AT LEAST ONE REQUIRED AT MESSAGE CREATION). IF MORE THAN ONE DESTINATION IS ADDED TO THE SEND REQUEST, EACH DESTINATION WILL BE ATTEMPTED UNLESS THE DESTINATIONS ARE PART OF A DESTINATION OR SEQUENCE (SEE BELOW).

DESTINATION OR LIST - BELONGS TO THE RECIPIENT. THESE IDENTIFY AN ORDERED LIST OF DESTINATIONS IN PRIORITY ORDER. EACH DESTINATION IS ATTEMPTED IN SEQUENCE UNTIL A SUCCESSFUL DELIVERY IS ACHIEVED (OPTIONAL).

EVENTHISTORY - AUTOMATICALLY GENERATED BY THE SMART SERVER APPLICATION AS STATUS DATA AND EVENT DATA IS RECEIVED FROM THE OUTPUT SERVER (FILLED IN BY SMART SERVER).

DOCUMENT - ACCEPTS EITHER THE ACTUAL BYTES OF THE DIGITAL DOCUMENT OR A FILE REFERENCE TO IT (AT LEAST ONE REQUIRED AT MESSAGE CREATION).

TEMPLATE - AN OVERLAY OR BORDER THAT IS OWNED BY THE DOCUMENT (OPTIONAL).

ATTACHMENT - ANALOGOUS TO INSERT ON THE PHYSICAL INSERTER (OPTIONAL).

RECIPIENT PREFERENCES - SET OF INSTRUCTIONS THAT ARE ON THE RECIPIENT'S "DESIRED" LIST (OPTIONAL).

SENDER REQUIREMENTS - SET OF INSTRUCTIONS THAT ARE ON THE SENDER'S "MUST HAVE" LIST (OPTIONAL).

FIG. 4B

ROUTER INSTRUCTION PROCESSOR FOR A DIGITAL DOCUMENT DELIVERY SYSTEM

TECHNICAL FIELD

The present invention relates to a router instruction processor for use in a digital document delivery system and method. It is particularly directed to such a system for interfacing with one or more electronic inserters and for controlling the presentation of documents, as well as the method of document presentation to a plurality of recipients.

BACKGROUND OF THE INVENTION

Digital document delivery systems are for use in delivering documents which otherwise would typically be delivered by hard copy printing processes. In a preferred embodiment of such a digital document delivery system as set forth in co-pending and commonly assigned application Ser. No. 09/222,196 entitled: System and Method for Presenting and Processing Documents on the Internet, owned by the present assignee, the digital document delivery system typically incorporates a router instruction processor (RIP), a bill processing server (BPS) and an interactive bill presentment server (IBPS), all of which operate in conjunction with an electronic inserter and an associated electronic print stream and customer preference data for generating a primary document to a customer typically in the nature of a bill, and for generating associated secondary documents (inserts) which would normally accompany the primary document.

SUMMARY OF THE INVENTION

The router instruction processor is a component within a digital document delivery system which is responsible for the processing of objects containing document data. These objects conform to those generated in an object-oriented environment such as that used in the JAVA programming language.

The router instruction processor thus services objects known as Send Request objects which are delivered to the router instruction processor from one or more electronic inserter clients. Each electronic inserter client in turn receives document data which based upon customer preference data which is used to form the Send Request object. Thus each Send Request object contains one or more documents with associated attachments, instructions and identification of one or more recipients. The Send Request object is used by the router instruction processor to forward the set of documents to their ultimate destination or destinations in a specific order and with an associated priority.

The router instruction processor has the ability to detect and adjust to failures associated with document delivery and in view of such failures, can reroute document delivery to alternate destinations. In addition to processing each Send Request object, the router instruction processor is also responsible for processing status messages that it receives from the bill processing server back to the associated electronic inserter client. It thus provides consolidated control and reporting to each electronic inserter client.

If the router instruction processor is used in a digital document delivery system associated with the processing of digital bill data, the router instruction processor processes Bill Request objects which are Send Request objects that contain specific information regarding bill attributes. The Bill Request object thus can contain additional functionality and data which is specifically related to bill processing.

Part of the functions performed by the router instruction processor is to process instructions that reconcile the requirements of the sender with a set of recipient preferences related to digital document delivery to the recipient at one or more destinations. Thus a recipient may specify within a Send Request object that he or she prefers to have a document sent to a particular fax machine but if that fax machine is inoperative, to send the document to a specific e-mail address. The sender however, may have the ability and need to override these recipient preferences due to concerns of the sender, such as security issues, reliability of transmission, etc. and may in view of these sender requirements, send the document to the recipient destination via the Internet as a second choice rather than the second choice preferred by the recipient which in the present example, was to a particular e-mail address.

The reconciling of the sender requirements to the recipient preferences for a plurality of recipients associated with one or more electronic inserters provides for a robust digital document delivery system.

Thus the router instruction processor is able to support the processing of messages from a plurality of electronic inserter clients and as such, is able to act as a general document fulfillment server with respect to those electronic inserter clients. The router instruction processor makes use of several components within the digital document delivery system to achieve these goals and specifically uses the processing capabilities of the digital document delivery system as follows: 1) uses the bill processing server to handle bill processing if the document is in the nature of a bill or invoice; 2) uses the interactive bill presentment server to handle digital document presentment, including document presentment via the Internet; 3) can use an output server to optionally handle digital document conversion and formatting for presentation as an e-mail message, a pager message, a message for presentation on the Worldwide Web or for fax destinations; and 4) if the digital document delivery system is for use in presenting bills or invoices to recipients, an associated payment processing system handles remittance processing via the bill processing server.

BRIEF DESCRIPTION OF THE DRAWINGS

For a fuller understanding of the nature and objects of the present invention, reference is made to the following detailed description taken in conjunction with the following drawings in which.

DETAILED DESCRIPTION

Figure 1:
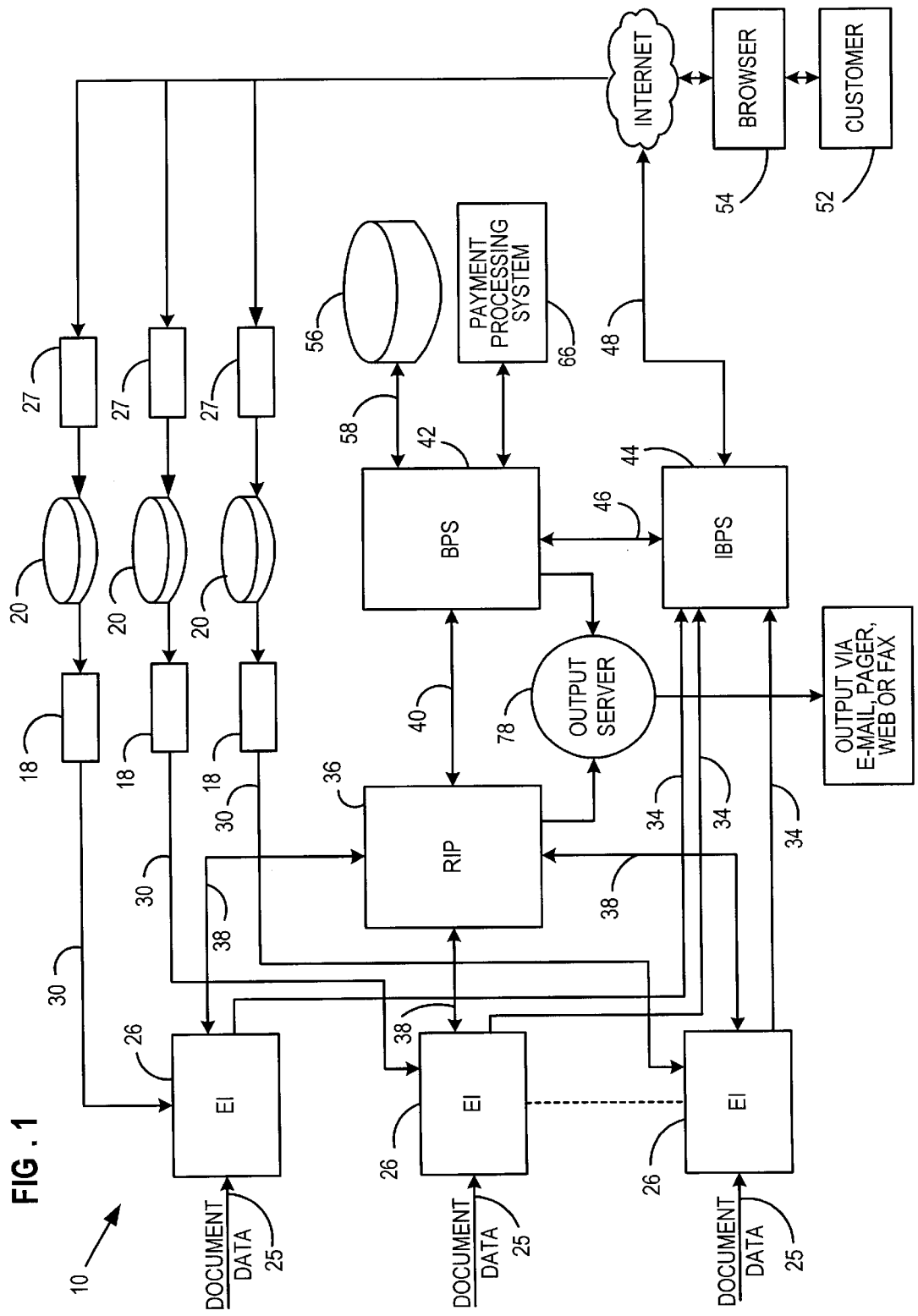
FIG. 1 is an overall block diagram of a digital document delivery system using a router instruction processor according to the present invention and illustrating the use of multiple electronic inserter clients interacting with the router instruction processor.

As used throughout this description, the words "user" and "customer" are synonymous as are the words "insert" and "secondary document". Definitions of acronyms are presented in Table 1. As best seen in FIG. 1, an overall digital document delivery system 10 of which the router instruction processor (RIP) 36 of the present invention forms an integral part thereof, comprises a plurality of computer servers operating to perform various functions. These various devices can be implemented on one or more known computer servers.

The overall operation of the digital document delivery system is more fully set forth in commonly assigned co-pending application Ser. No. 09/222,219 entitled, System and Method for Presenting and Processing Documents on the Internet (E-789), which is incorporated by reference.

Further disclosure of a digital document delivery system is set forth commonly assigned in co-pending application Ser. No. 09/222,196 entitled "System and Method for Separating a Print Stream into an Electronic Data Print Stream in a Physical Document Print Stream (E-780), which is also incorporated by reference. As disclosed therein, the digital document delivery system is directed to generating an electronic equivalent of a primary document with one or more inserts associated therewith. Although the digital document delivery system is contemplated for submission of a primary document with one or more secondary or inserts documents, digital document delivery system can be used for presentation of documents without a primary secondary interrelationship. An interactive bill presentment server (IBPS) 44 generates HTML or other web-based language documents for delivery preferably via the Internet to a customer 52 using a web browser 54 on the customer's associated computer. By so doing, the document delivered to the customer is presented on the customer's monitor via the web browser. As seen in FIG. 1, the present invention is directed to an RIP 36 which interacts with one or more electronic inserter (EI) clients 26 that in general receive document data via respective electronic print streams 25.

Module Operation

Figure 2:
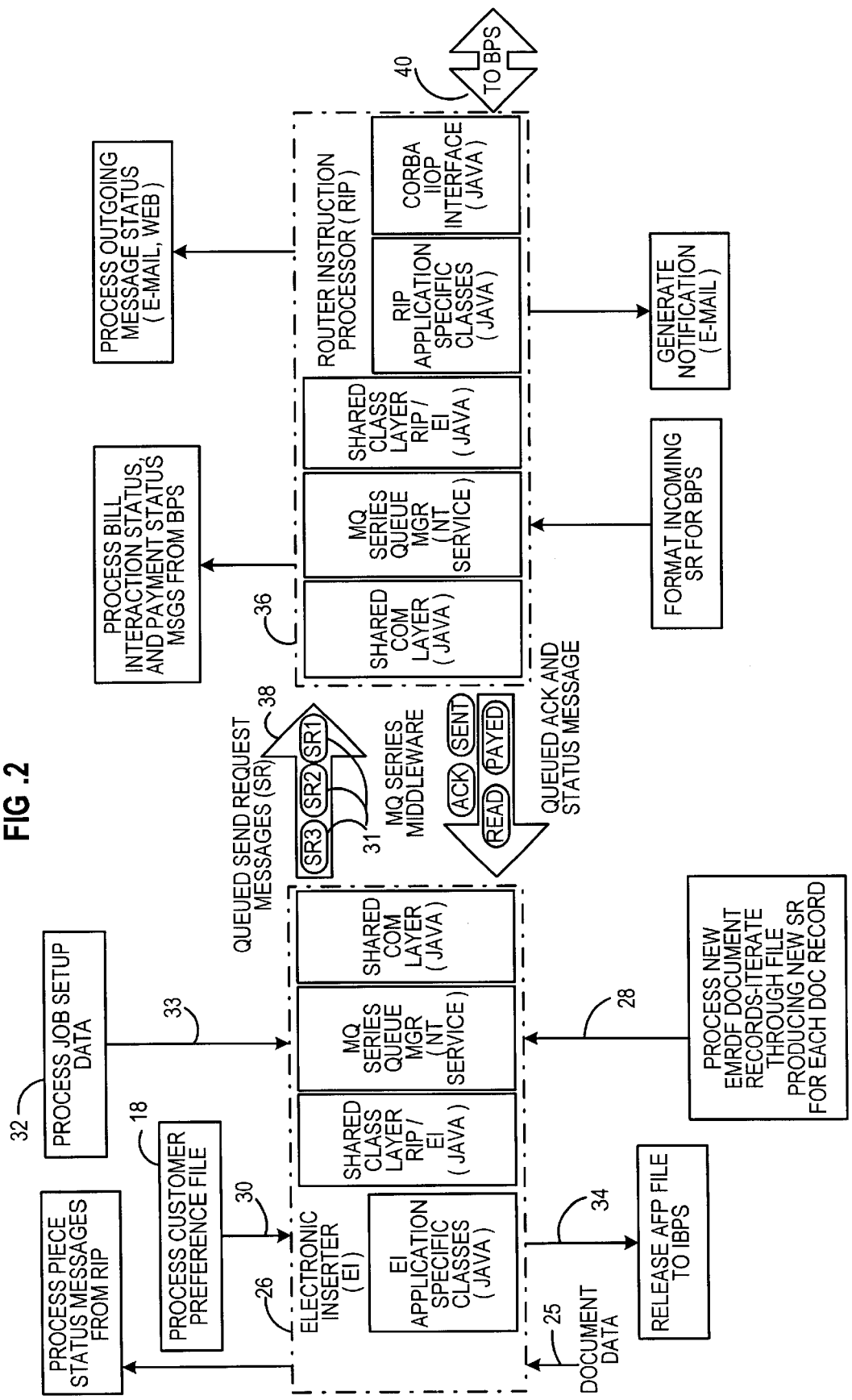
FIG. 2 is a block/flow diagram of an electronic inserter client and the router instruction processor forming part of an overall digital document delivery system and showing details and object flow associated with a representative electronic inserter and the router instruction processor.
Figure 3:
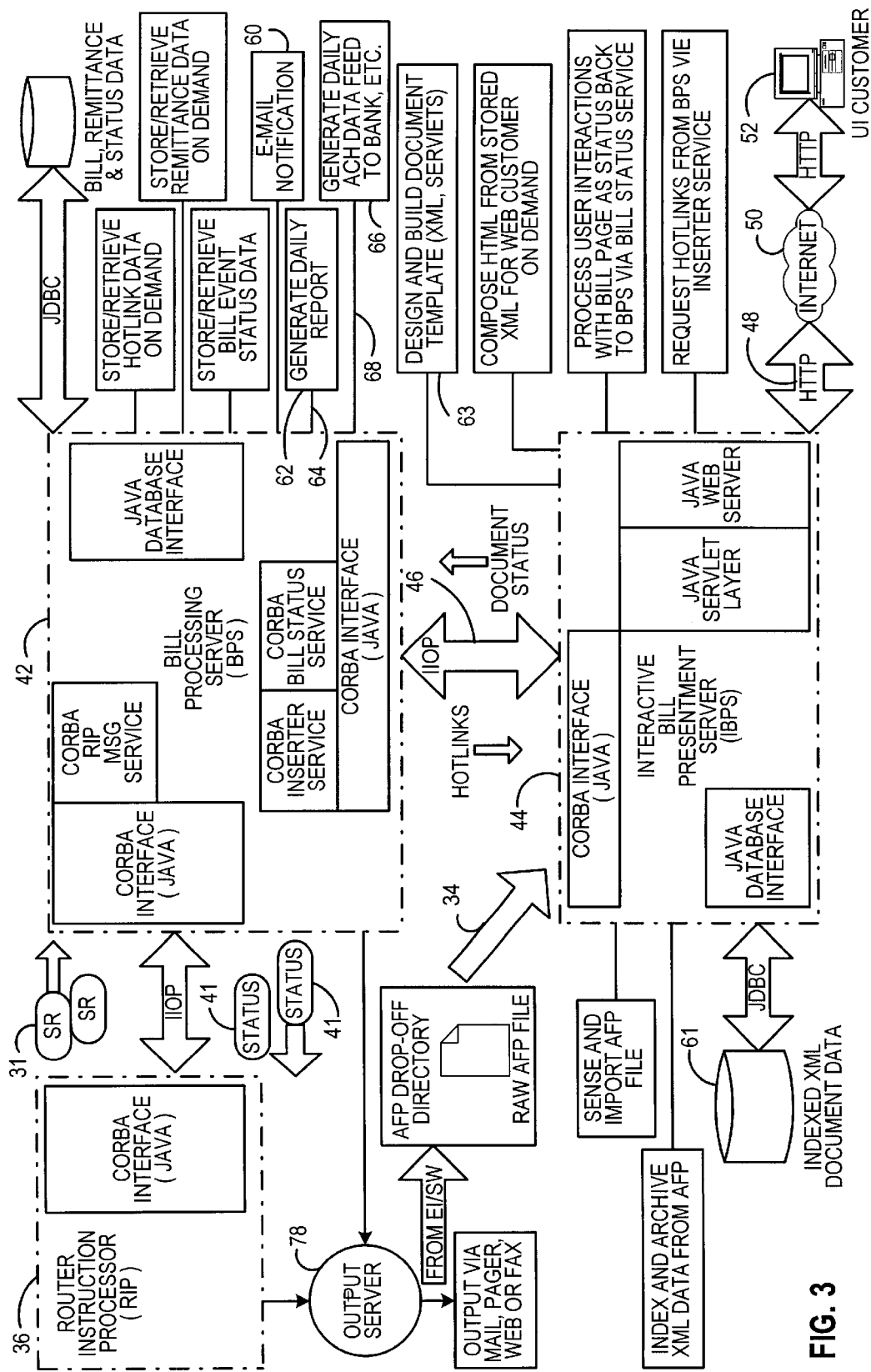
FIG. 3 is a block/flow diagram of the router instruction processor, bill processing server, and interactive bill presentment server of an overall digital document delivery system and showing details and object flow associated with these modules.

As best seen in FIGS. 2 and 3, the RIP communicates primarily with the EI's 26 and the bill presentment server BPS 42. In operation, the BPS 42 monitors the IBPS 44 via communication path 46. The IBPS 44 is responsible for receiving electronic print data stream files from each of the EI's 26 via communication paths 34. The IBPS 44 processes these documents so as to be later presentable to the user 52. It is only after the documents have been so pre-processed that the user can actually view the documents intended for that user via a web browser 54 over communication path 48 forming part of the Internet. The IBPS 44 is also responsible for generating account information known generally as bill status update information which is communicated to the BPS 42. This bill status update information typically includes a customer account number, the date the bill was run if the document is a bill, whether the bill has been loaded, whether it has been accessed by the customer, whether it has been paid by the customer, and the like. Some of this information as generated by the IBPS 44 is received via communication 48 from the customer 52 at his or her computer via the associated browser software 54 that is run on the customer's computer 52.

In the preferred embodiment of the present invention, the IBPS 44 generates the Internet browser viewable data stream when requested by the customer by use of the @Work Technologies Internet billing system known as the Work-Out™ Internet Billing System for generating browser viewable information such as in hypertext markup language (HTML) or other browser compatible languages (now or in the future), including Extensible Markup Language (XML) and Java. As seen in FIGS. 1 and 3 it should be noted that in operation, the IBPS 44 receives the raw print data 34 from the EI's 26 and generates an intermediate document corresponding to this print data using the XML language, which in turn is stored and indexed in the intermediate document database 61, such as a Oracle™ database. Part of the information for generating an intermediate document is derived from design and build document templates 63. The location for placement of secondary document links based upon the received priority of the secondary document from an Electronic Mail Run Data File (EMRDF) file and the overall design of the primary document can be stored in these templates.

The IBPS 44 receives the specified links (called "Hotlinks") for the secondary document or documents from the BPS 42. The BPS 42 also acts as an electronic "traffic cop", by not allowing the IBPS 44 to generate viewable documents unless the PBS 42 determines that all related documents and account information (if related to a billing function) is ready for viewing.

When the digital document delivery system 10 is used for billing functions, the BPS 42 communicates with a bill remittance and status database 56 via communication path 58 for retrieving and updating bill remittance and status data concerning customer bills based upon information received via the BPS 42 from the IBPS 44 which in turn receives information from the customer 52 via the Internet in the associated browser 54 communicating with the Internet.

The BPS 42 furthermore is responsible for notifying the customer 52 that a bill or other information is available for viewing via the Internet. The BPS 42 performs this task in any of a plurality of ways, such as by generating an e-mail notification message which can be sent over the Internet to the customer's e-mail address as diagrammatically shown by e-mail event 60. Of course, other methods could be used by the BPS 42 to notify the customer 52, such as generating a facsimile message and sending it via facsimile to the customer's facsimile machine; by generating a beeper message for presentation to the customer's beeper; or even by generating a print mail message to be delivered to the customer's mail address.

The BPS 42 is also responsible for generating daily reports concerning the overall status of the digital document delivery system 10. These reports can be communicated to a biller module 62 via a communication path 64 and may contain information such as daily account receivable reports, information concerning customers that have not paid their respective bills for a certain period of time, customers who have not viewed a bill after a certain period of time, etc.

When the digital document delivery system 10 is used for billing functions, the BPS 42 is responsible for generating information for presentation to an associated bank 66 via communication path 68. Such information would typically include the daily ACH Batch Feed File information and any other information which the proprietor of the digital document delivery system 10 wants communicated to the associated bank.

RIP Overview

As best seen in FIGS. 1, 2 and 3, the RIP 36 is a component within the overall digital document delivery system 10 and is responsible for processing digital messages containing document data. More specifically, as seen in FIGS. 2 and 3, the RIP 36 services each Send Request object 31 received from any of the EI's 26 which act as clients with respect to the RIP server 36. Each Send Request object preferably contains a set of documents, attachments, instructions, and recipients. This information is used by the RIP 36 to forward the set of documents to their ultimate destination(s), in a specific order and priority. The RIP 36 has the capability to detect and adjust to failures in document transmission such that it can reroute documents to alternate destinations if a failure in document transmission occurs. In addition to processing each Send Request object, the RIP 36 also is responsible for processing status messages back to each of the El clients 26 as shown diagrammatically by status messages 41. When the Send Request is in the nature of a digital bill for purposes of processing digital bill data, the RIP 36 processes Bill Request objects which are in fact Send Request objects with more specific bill attributes. Thus the Bill Request objects are Send Request objects but contain additional functionality and data relating to the bill processing function.

Send Request Object

Figure 4A:
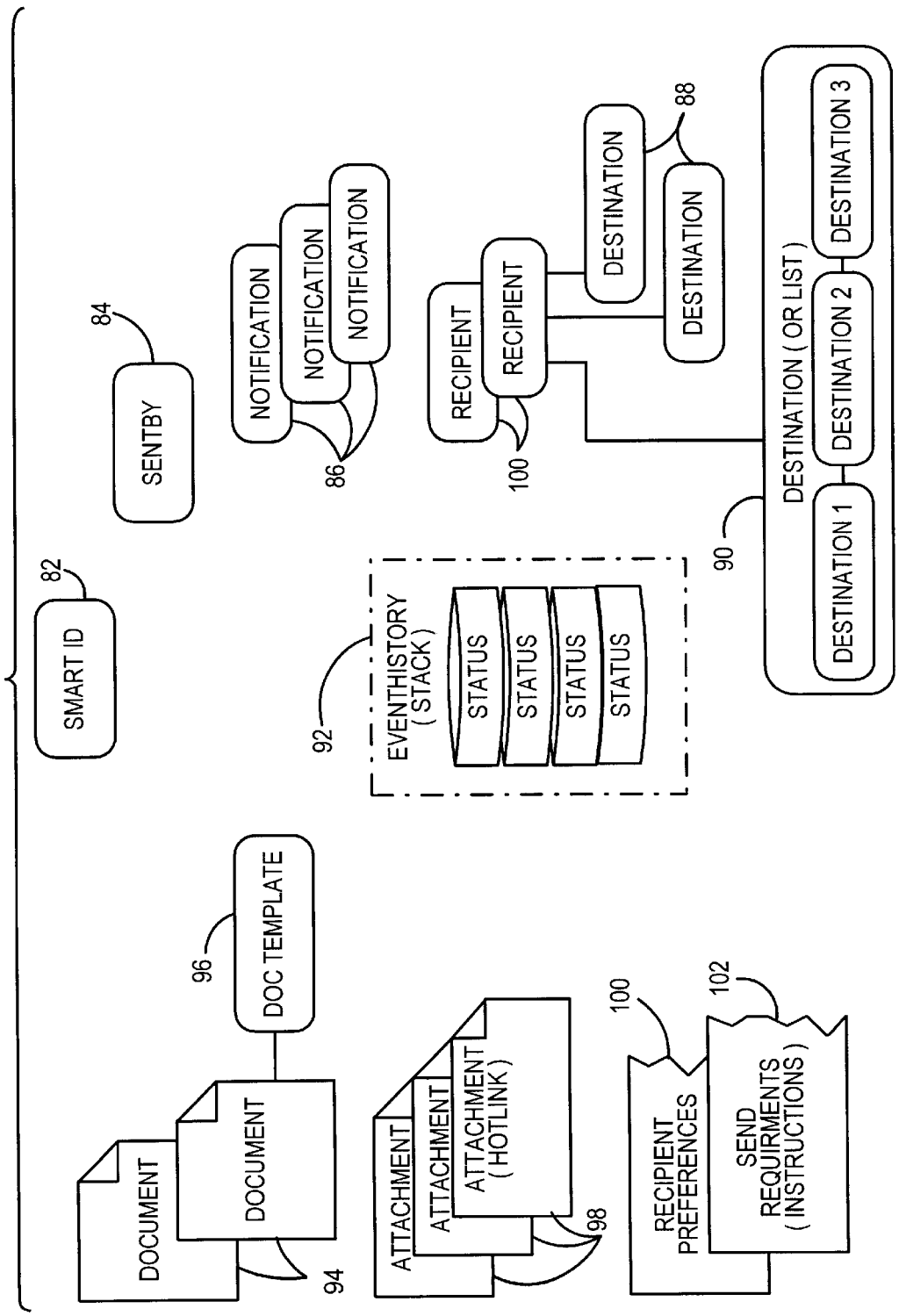
FIGS. 4a are block diagrams of a Send Request object and the definitions 4b associated therewith.

The overall definition of a Send Request object is set forth in FIG. 4*a*. It is there seen that the object contains certain required information, and may contain certain optional information. The overall definition of the elements forming a Send Request object are presented in FIG. 4*b*. Thus the SMART ID 82 is an element forming part of the object which is established to identify the creator of the object.

The sentBy element 84 stores the identity and location of the sender who initiated the Send Request object. This element is required at the time of message creation.

The Notification element 86 is information which stores any notifications which are to be associated with the Send Request object and as such, is optional. Such notifications could be presented to third parties and may indicate that the Send Request object has been created or has been sent to the specified recipient or recipients at the specified destination or destinations.

The Destination element 88 is associated with a recipient and at least one is required at the time of message creation. If more than one destination is added to a Send Request object, each destination is attempted unless the destinations are part of a Destination OR List element 90 as seen in FIG. 4. Thus in the example shown in FIG. 4*a* where each recipient has a different destination, each destination will be used except with regard to the Destination or Sequence where only one of three destinations (i.e., destination 1, destination 2 or destination 3) is used with selection on a prioritized basis. Thus if the highest priority destination is not available, the next highest priority destination is attempted, and used if available. Thus the Destination OR List 90 is an ordered list of destinations in a prioritized fashion. Each destination is attempted in sequence unless a successful delivery is achieved at an earlier destination.

The eventHistory element 92 is automatically generated by the server application as status data and event data is received from the output server (the server that generates the Send Request object). This information thereby provides a mechanism for determining the history associated with the Send Request object in terms of status and event occurrences.

The Document element 94 represents one or more documents which can be presented as actual bytes of digital document information or as a reference to the digital document. At least one document is required at the time of message creation.

The Document Template element 96 relates to an overlay or border that is owned by any one of the Documents 94. This template is optional. The document overlay thereby provides a way of presenting documents in a particular manner if such is desired.

The Attachment element 98 is analogous to a physical insert associated with a physical primary document and as such, can represent any type of secondary document to be associated with a primary document 94. The Send Request object typically contains attachments associated with documents by means of a "hotlink" which is a reference location to the site where the attachment is located.

Recipient preferences 100 relate to a set of instructions that are on the recipient's "desired" list and as such, may relate to the manner in which document delivery is preferred or in which notification of document presence is communicated to the recipient. These recipient preferences are optional. The Sender requirements 102 are a set of instructions that are on the senders "must have" list and thus take precedence if a conflict exists between these instructions and those of the Recipient preferences. The sender requirements are also optional.

RIP Operation

Thus, one of the main functions of the RIP 36 is to process a set of instructions that reconcile the Sender requirements with a set of Recipient preferences for delivering digital documents to their ultimate destinations. For example, a recipient may specify in a particular Send Request object that he/she prefers to have the document sent to a fax machine, but if the specified fax machine is inoperative, to have the document send to them via e-mail. On the other hand, the sender may have Sender requirements to override these Recipient preferences due to concerns associated with security of the digital document delivery system 10 or delivery of objects thereby, the reliability of transmission of documents in a particular fashion and the like, and thus may send the documents via the Worldwide Web rather than sending them via e-mail.

The RIP 36 is architectured to support the processing of messages from a number of El clients and thus acts as a general document fulfillment server for those clients. The RIP 36 is also responsible for communication status information to the El clients 26. The RIP 36 makes use of several other components within the digital document delivery system 10 as best seen in FIGS. 2 and 3. These components focus on specific processing capabilities. Thus the BPS 42 handles all bill processing requirements for digital document delivery system 10, the IBPS 44 handles digital document presentation via the Worldwide Web in association with information received via the BPS 42. The Output Server 78 is an optional component of a digital document delivery system 10 and handles digital document conversions and formatting for presentation of information by e-mail, pager, worldwide web and fax destinations. The payment processing system 66 is also an optional component of a digital document delivery system 10 and handles remittance processing via the BPS 42.

Module Details

Details of the modules described above including the RIP 36 are presented in Table 2. It should be noted that these modules can be implemented on various computer servers such as the Intel processor based servers using Microsoft Windows NT™ or UNIX™ operating systems. A high level object oriented language such as Sun Microsystems, Java programming language can be preferably used to implement the specific instructions for performing the above-described tasks. With regard to Table 2, reference should be made to FIGS. 2 and 3.

In summary, the router instruction processor performs the function of a general document fulfillment server in association with an overall digital document delivery system 10. The router instruction processor makes use of various components within the digital document delivery system 10 to ensure that documents as contained in a Send Request object are presented to their destinations according to sender requirements and recipient preferences with the associated priorities related thereto. The router instruction processor thereby is a key element of an overall digital document delivery system 10 so as to ensure its efficient and reliable delivery of digital documents.

In the foregoing specification, the invention has been described as referenced to specific embodiments thereof. It will, however, be evident that various modifications and changes may be made thereto without departing from the broader spirit and scope of the invention. The specification and drawings are, accordingly, to be regarded as illustrative rather in a restrictive sense.

TABLE 1

| ACRONYMS | DEFINITIONS |
|---|---|
| ACH | Automated Clearing House |
| AFP | Advanced Format for Printing |
| ASCII | American Standard Code for Information Exchange |
| CORBA | Common Object Request Broker Architecture |
| EBCDIC | Extended Binary Coded Decimal Interchange Code |
| HTML | Hypertext Markup Language |
| HTTP | Hypertext Transport Protocol |
| IIOP | Internet Inter-ORB Protocol |
| JDBC | JAVA Database Connectivity |
| MRDF | Mail Run Date File |
| ORB | Object Request Broker |
| PDF | Portable Document Format |
| SMTP | Simple Mail Transfer Protocol |
| XML | Extended Markup Language |

TABLE 2

| MODULE | FUNCTION |
|---|---|
| Enrollment Application Module 27 | Capture customer account number, full name of customer, email address of customer, checking account number, customer's account bank name, bank routing number, WEB password |
| Electronic Inserter 26 | Get data from Job Setup Module 32, customer preference file from customer preference database 20, print stream separator 16 and EMRDF output, compose bill request objects (bR), receive status messages from RIP, control AFP feed to IBPS. |
| Job Setup Application 32 | Produce file of inserts in the form of hotlinks that are logically assigned to physical inserter bins. |
| Router Instruction Processor (RIP) 36 | Service incoming requests from multiple clients (EIs), route requests to FAX, EMAIL, WEB, LOCAL PRINT, and PAGER, issue notifications based on status received, process status back to clients. |
| Database Account 56 | Store remittance data, bill data, and status data for digital bills. |
| Bill Processing Server (BPS) 42 | Save and retrieve bill data to the database, service CORBA requests for hotlinks from IBPS, process bill status messages from IBPS back to the RIP, issue reports and initiate payments feeds. |
| Interactive Bill Present Server (IBPS) 44 | Process interactive events performed on the bill by customers, render HTML to customers based on downloaded servlets and stored XML rules, design document templates. |

What is claimed is:

1. A router instruction processor for use in a digital document delivery system having at least one electronic inserter (EI), a bill processing server (BPS) and an interactive bill presentment server (BPS), the router instruction processor for processing Send Request objects, wherein each Send Request object contains information regarding a document, N attachments, P instructions and Q recipients, as received from at least one electronic inserter, where N is a non-negative integer, P is a positive integer and Q is a positive integer, the router instruction processor comprising:

A) means for receiving the Send Request objects from each electronic inserter;

B) means for instructing the BPS to instruct the IBPS to forward each specified document to each specified recipient; and C) means for receiving information from the BPS indicating that a specified recipient has received a specified document and communicating this information to the EI that sent the Send Request containing information regarding the specified document; and wherein the Send Request object contains a Recipient Preferences element that identifies instructions from at least one of the identified recipients with respect to the preferred manner of document delivery and wherein the Send Request object further contains a Sender Requirements element that identifies specific requirements with respect to document delivery and wherein the router instruction processor further comprises means for using these requirements with respect to document and attachment delivery and also uses the preferred manner of document delivery as set forth in the Recipient Preferences element, wherein said router instruction processor means overrides the Recipient Preferences element instructions to the extent that these instructions are in conflict with the requirements of the Sender Requirements.

2. A router instruction processor as defined in claim 1, wherein an element of the Send Request object is a Destination OR List containing information regarding more than one recipient in a prioritized list, wherein the router instruction processor causes the document and any attachment to be sent to the highest priority recipient in the list that accepts delivery of the document.

3. A router instruction processor as defined in claim 1, wherein the Send Request object contains an attachment element identifying at least one secondary document to be associated with the document element, and wherein the router instruction processor transfers the element with the Send Request object to the BPS.

4. A router instruction processor as defined in claim 1, wherein the Send Request object maintains an eventHistory stack regarding the status of the Send Request object.

5. A router instruction processor as defined in claim 1, wherein the digital document delivery system 10 includes an output server, and wherein the BPS communicates Send Request object information to the output server if specified types of document delivery are to be used by the digital document delivery system.

6. A router instruction processor as defined in claim 1, wherein the router instruction processor controls document delivery of all received Send Request objects.

7. A method of sending digital documents as identified in Send Request objects, wherein each Send Request object contains information regarding a document, N attachments, P recipients and Q destinations, where N is a non-negative integer, P is a positive integer, and a is a positive integer, wherein the method comprises the steps of:

1) receiving each Send Request object;

2) determining each recipient contained in the Send Request object;

3) determining a destination of recipients from the Send Request object; and 4) based upon the destination of recipients, sending the document and each attachment to the recipient at the specified destination and wherein the Send Request object contains a Recipient Preference element that identifies instructions from at least one of the identified recipients with respect to the preferred manner of document delivery, and wherein these recipient instructions are used with respect to document and attachment delivery; and wherein the Send Request object also contains a Sender Requirements element that identifies specific requirements with respect to document delivery, and wherein the method uses the identified specific requirements with respect to document and attachment delivery, including overriding the Recipient Preferences element instructions to the extent these instructions are in conflict with the document delivery requirements of the Sender Requirements element.

8. A method of sending digital documents as defined in claim 7, wherein the Send Request object contains a Destination OR List containing a prioritized list of destinations, and wherein the method causes the document and each attachment to be sent to the destination with the highest priority that accepts delivery of the document.

\* \* \* \* \*